US012559078B2

(12) United States Patent
Prim

(10) Patent No.: US 12,559,078 B2
(45) Date of Patent: Feb. 24, 2026

(54) BRAKING SYSTEM, COMPUTER-IMPLEMENTED METHOD OF CONTROLLING A BRAKING SYSTEM OF A RAIL VEHICLE, COMPUTER PROGRAM AND NON-VOLATILE DATA CARRIER

(71) Applicant: DELLNER BUBENZER AB, Borlänge (SE)

(72) Inventor: Viktor Prim, Sandviken (SE)

(73) Assignee: DELLNER BUBENZER AB, Borlänge (SE)

( * ) Notice: Subject to any disclaimer, the term of this patent is extended or adjusted under 35 U.S.C. 154(b) by 35 days.

(21) Appl. No.: 18/834,669

(22) PCT Filed: Dec. 30, 2022

(86) PCT No.: PCT/EP2022/088094
§ 371 (c)(1),
(2) Date: Jul. 31, 2024

(87) PCT Pub. No.: WO2023/174575
PCT Pub. Date: Sep. 21, 2023

(65) Prior Publication Data
US 2025/0153699 A1 May 15, 2025

(30) Foreign Application Priority Data
Mar. 16, 2022 (EP) ..................................... 22162522

(51) Int. Cl.
*B60T 13/74* (2006.01)
*B60T 8/17* (2006.01)
*B60T 17/00* (2006.01)
(52) U.S. Cl.
CPC .......... *B60T 13/741* (2013.01); *B60T 8/1705* (2013.01); *B60T 17/006* (2013.01)

(58) Field of Classification Search
CPC .... B60T 13/741; B60T 8/1705; B60T 17/006; B60T 13/74; B60T 17/221
See application file for complete search history.

(56) References Cited

U.S. PATENT DOCUMENTS

| | | | | |
|---|---|---|---|---|
| 4,809,824 A | * | 3/1989 | Fargier | B60T 13/741 188/106 P |
| 2016/0069405 A1 | * | 3/2016 | Meyer | B61H 9/006 188/73.1 |
| 2017/0197597 A1 | * | 7/2017 | Grunwald | B61H 11/00 |

FOREIGN PATENT DOCUMENTS

| | | |
|---|---|---|
| CN | 206481022 U | 9/2017 |
| WO | 2015/180474 A1 | 12/2015 |
| WO | 2016/041760 A1 | 3/2016 |

* cited by examiner

*Primary Examiner* — Xiao En Mo
(74) *Attorney, Agent, or Firm* — Dilworth & Barrese, LLP.; Michael J. Musella, Esq.

(57) ABSTRACT

A braking system for a rail vehicle (100) has a brake actuator (120) that receives a brake command (cmd$_B$) and produces an electric brake-force signal (BF) commanding a brake action. A brake unit (200) receives the electric brake-force signal (BF) and causes an electric motor (230) to act on a gear assembly causing first and second pressing members (211) to move towards or away from a rotatable member (110) mechanically linked to at least one wheel (105) of the rail vehicle (100) to execute the brake action with respect to the rotatable member (110). If a deicing criterion (DI) is fulfilled, the brake actuator (120) is configured to produce the electric brake-force signal (BF) in such a way that the brake action involves moving the first and second pressing members (211; 212) away from the rotatable member (110) so as to remove any ice and/or snow on the brake unit (200).

20 Claims, 4 Drawing Sheets

START

710
Deicing
criterion fulfilled?          No

720
Yes

Produce brake-force signal causing a brake
action that involves moving first and second
pressing members away from rotatable member 730
Deicing
criterion fulfilled?          Yes No

BRAKING SYSTEM, COMPUTER-IMPLEMENTED METHOD OF CONTROLLING A BRAKING SYSTEM OF A RAIL VEHICLE, COMPUTER PROGRAM AND NON-VOLATILE DATA CARRIER

TECHNICAL FIELD

The present invention relates generally to retardation and immobilization of rail vehicles. Especially, the invention relates to a braking system for a rail vehicle according to the preamble of claim 1 and a corresponding computer-implemented method. The invention also relates to a computer program and a non-volatile data carrier storing such a computer program.

BACKGROUND

In operation of an electrically powered rail vehicle, the onboard motors are typically engaged as generators to decelerate the rail vehicle. However, for efficiency and safety reasons, one cannot rely solely on this braking strategy. In particular, a dedicated brake function will always be needed to ensure emergency braking functionality and that the rail vehicle remains stationary after that it has been brought to a stop.

In many cases, the same brake units are used for different types of braking functionality, such as service braking, emergency braking and parking braking. Today's rail vehicle brakes characteristically use pneumatically regulated brakes. This is disadvantageous inter alia due to their slow and imprecise regulation, however also because the risk of leakages and resulting malfunction.

Recently, electrically controlled brakes have been presented as an alternative to pneumatically regulated brakes. For example, US 2020/0198605 describes a microcomputer-controlled electromechanical braking system containing an electromechanical braking control device and an electromechanical braking unit. The electromechanical braking control device includes a braking microcomputer control unit, an electromechanical control unit and a standby power supply module. The braking microcomputer control unit receives a braking instruction signal sent by a driver or an automatic driving system, performs the calculation of a target braking force and braking management. If the electromagnetic brake is powered off, a screw-and-nut arrangement locks the brake to maintain the braking force. When a torque motor rotor rotates reversely, the nut makes a translational motion reversely, and the braking force is released.

JP H0671947 shows a defroster device and a running braking device for a vehicle, in which one of the wheels does not slip or the brakes do not have any effect when braking is performed. A transmission is equipped with a defroster device, wherein a brake fork is pivotally supported on a brake operation shaft of a braking device. The brake fork is configured to engage with a defroster slider for actuating the defroster device. A cam mechanism allows the brake fork to slide in the defroster direction during braking when the brake operation shaft is rotated.

JP 4719700 discloses an electric parking brake apparatus that operates wheel brakes by driving a brake operating force transmission system in one direction by a brake operating force generated by an electric motor, and to hold the brake operating force by an electromagnetic brake when the electric motor is stopped. The presence or absence of freezing of the brake operating force transmission system is determined depending on whether or not it is difficult to move the brake operating force transmission system. If a freezing occurs, ice adhered to the brake operating force transmission system may be crushed by driving the electric motor in one direction to further pull the brake operating force transmission system.

Thus, electromechanical braking systems, as such, are known. The prior art also includes a solution for detecting and removing ice in an electric parking brake apparatus for a vehicle. However, there is no technical solution ensuring full brake functionality for a rail vehicle under all kinds icy and snowy conditions.

SUMMARY

The object of the present invention is therefore to offer a solution that solves the above problem and provides an electric-based braking function for a rail vehicle, which is unaffected by the weather conditions.

According to one aspect of the invention, the object is achieved by a braking system for a rail vehicle, which braking system contains a brake actuator and a brake unit. The brake unit, in turn, includes first and second pressing members and a rotatable member being mechanically linked to at least one wheel of the rail vehicle. The brake unit also contains a gear assembly arranged to operate mechanically on the first and second pressing members and an electric motor. The brake actuator is configured to receive a brake command, and in response thereto produce an electric brake-force signal commanding a brake action. The brake unit is configured to receive the electric brake-force signal, and in response thereto control the electric motor to act on the gear assembly so that the first and second pressing members are caused to move towards or away from the rotatable member. Specifically, if a deicing criterion is fulfilled, the brake actuator is configured to produce the electric brake-force signal in such a way that the brake action involves moving the first and second pressing members away from the rotatable member.

The above braking system is advantageous because the active outward movement of the first and second pressing members has a highly efficient ice-breaking effect on any ice formation that may have occurred on the braking system at any point in time, i.e. during travel as well as while the train vehicle has stopped at a station.

According to one embodiment of this aspect of the invention, if the deicing criterion is fulfilled, the brake actuator is configured to produce the electric brake-force signal in such a way that the brake action involves moving the first and second pressing members towards and away from the rotatable member in a vibrating movement pattern. These alternatingly outward and inward movements of the pressing members has an ice-crushing effect that removes any ice from the braking system in a very efficient manner. Of course, this vibration may be employed with purpose of deicing irrespective of how the first and second pressing members are arranged initially, e.g. in contact with the rotatable member or in an unbraked state.

According to another embodiment of this aspect of the invention, a temperature sensor is arranged to generate a temperature signal indicative of an ambient temperature level. For example, the temperature signal may be obtained from an onboard sensor for providing general temperature information to various units and functionalities in the train vehicle. Alternatively, a dedicated temperature sensor may be integrated into the brake actuator. The brake actuator is configured to receive the temperature signal. If the ambient temperature level is less than a threshold temperature during at least a predefined period, the brake actuator is configured to produce a first trigger signal that causes the deicing criterion to be fulfilled. This means that if for example the rail vehicle is exposed to freezing degrees, a deicing action will be taken, which at least one involves moving the first and second pressing members away from the rotatable member.

According to yet another embodiment of this aspect of the invention, the braking system contains a controller configured to generate a second trigger signal repeatedly according to a time schedule, which second trigger signal causes the deicing criterion to be fulfilled. Thereby, proactive brake deicing measures may be effected without imposing any deceleration on the train vehicle.

Analogous to the temperature sensor, the controller may either be integrated into the brake actuator or be represented by a separate unit.

According to still another embodiment of this aspect of the invention, the braking system contains a brake sensor configured to determine a respective gap distance between brake pads of the first and second pressing members and the rotatable member. The brake actuator is further configured to compare the determined respective gap distances with a set gap distance between the brake pads of the first and second pressing members and the rotatable member, which set gap distance is a parameter assigned in the brake action, for example corresponding to a particular brake force. Here, the deicing criterion is considered to be fulfilled if the magnitude of a difference between the set gap distance and the respective determined gap distances exceeds a tolerance interval. Namely, such a discrepancy is highly correlated with ice formation on the pressing members and/or on the rotatable member. Thus the magnitude of the difference between the set gap distance and the respective determined gap distances is an efficient deicing trigger.

According to another embodiment of this aspect of the invention, the gear assembly includes a pulse encoder configured to generate a pulse signal reflecting a position interrelationship between the first and second pressing members, and the brake sensor is configured to determine the gap distance based on the pulse signal. This is beneficial because it is straightforward to arrange a pulse encoder such that there is a one-to one relationship between the pulse signal and the position interrelationship between the first and second pressing members.

According to a further embodiment of this aspect of the invention, the gear assembly includes a load-cell sensor configured to produce a force signal reflecting the magnitude of a force applied by the first and second pressing members on the rotatable member, and the brake sensor is configured to determine the gap distance based on the force signal. This is beneficial because the force signal provides a reliable basis for determining whether or not the commanded brake action has been effected.

According to one embodiment of this aspect of the invention, the brake sensor is configured to determine the gap distance based on the magnitude of a current fed to the electric motor and a period during which the current has been fed to the electric motor. For example, this is an efficient way to establish an output torque of a DC motor's power transmission shaft.

Alternatively, the first and second pressing members may contain at least one ultrasonic sensor configured to emit ultrasound energy and produce at least one ranging signal based on reflections of the emitted ultrasound energy against the rotatable member. Here, the brake sensor is configured to determine the gap distance based on the at least one ranging signal. Thus, a measure of the gap distance is obtained completely independent from the electric motor.

According to yet another embodiment of this aspect of the invention, after producing the electric brake-force signal in such a way that the brake action involves moving the first and second pressing members away from the rotatable member, the brake actuator is configured to establish the magnitude of the difference between the set and determined gap distances. If said magnitude is less than or equal to the tolerance interval, the brake actuator is configured to regard the deicing criterion not to be fulfilled. In other words, when discrepancy between the set and determined gap distances is acceptably small again, the deicing criterion is cleared.

According to still another embodiment of this aspect of the invention, the brake actuator is configured to receive a user-generated deactivation instruction; and in response thereto, regard the deicing criterion not to be fulfilled. Consequently, for example a driver of the rail vehicle may manually reset the deicing criterion.

Analogously, according to a further embodiment of this aspect of the invention, the brake actuator is configured to receive another user-generated activation instruction; and in response thereto, regard the deicing criterion as fulfilled. Hence, the driver may manually set the deicing criterion, for example if he/she foresees ice/snow related problems.

Preferably, the brake actuator is configured to generate an acknowledgement message in response to the regarding the deicing criterion being set and/or reset. Thereby, the driver may gain confirmation of a current status for the deicing criterion.

According to another aspect of the invention, the object is achieved by a computer-implemented method of controlling a braking system for a rail vehicle. Here, it is presumed that the braking system contains a brake actuator, and the method is executed by at least one processor in the brake actuator. The method involves receiving a brake command, and in response thereto producing an electric brake-force signal commanding a brake action. It is further presumed that the braking system contains a brake unit having first and second pressing members and a rotatable member being mechanically linked to at least one wheel of the rail vehicle. The brake unit is configured to receive the electric brake-force signal, and in response thereto cause the first and second pressing members to execute the brake action with respect to the rotatable member. Specifically, the brake unit also contains a gear assembly arranged to operate mechanically on the first and second pressing members. Moreover, the braking system includes an electric motor, which is configured to act on the gear assembly so as to cause the first and second pressing members to move towards or away from the rotatable member in response to the electric brake-force signal. Additionally, the method involves checking if a deicing criterion is fulfilled. If it is found that the deicing criterion is fulfilled, the electric brake-force signal is produced in such a way that the brake action involves moving the first and second pressing members away from the rotatable member. The advantages of this method, as well as the preferred embodiments thereof are apparent from the discussion above with reference to the proposed parking brake system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
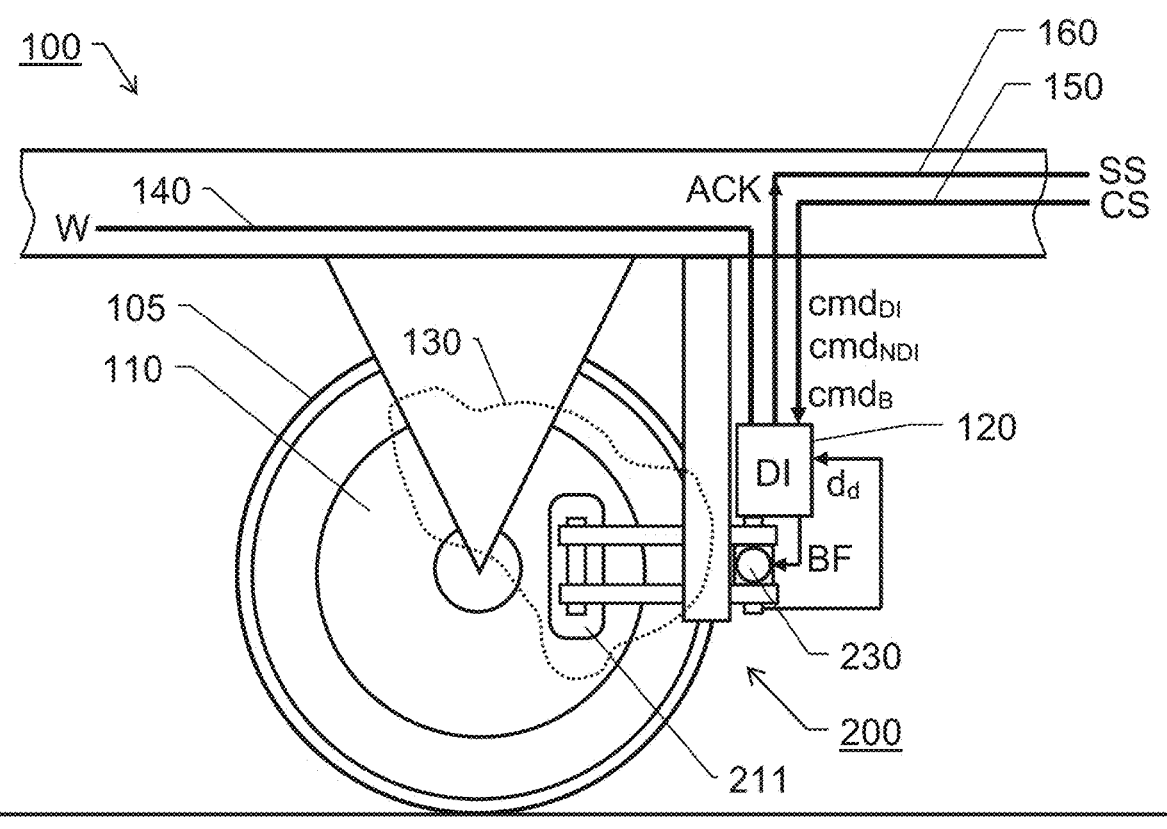
FIG. 1 schematically illustrates a rail vehicle equipped with a braking system according to one embodiment of the invention.

In FIG. 1, we see a schematic illustration of a rail vehicle 100 equipped with a braking system according to one embodiment of the invention. The braking system contains a brake actuator 120 and a brake unit 200.

The brake actuator 120 is configured to receive a brake command $cmd_B$, which typically has been generated based on a driver's instruction. Naturally, however, the brake command $cmd_B$ may equally well be generated automatically, for example if a particular set of criteria is fulfilled, e.g. indicating an emergency situation.

The brake actuator 120 is configured to receive the brake command $cmd_B$, and in response thereto produce an electric brake-force signal BF commanding a brake action, for example designating service braking at a particular force, emergency braking or parking braking.

Figure 2:
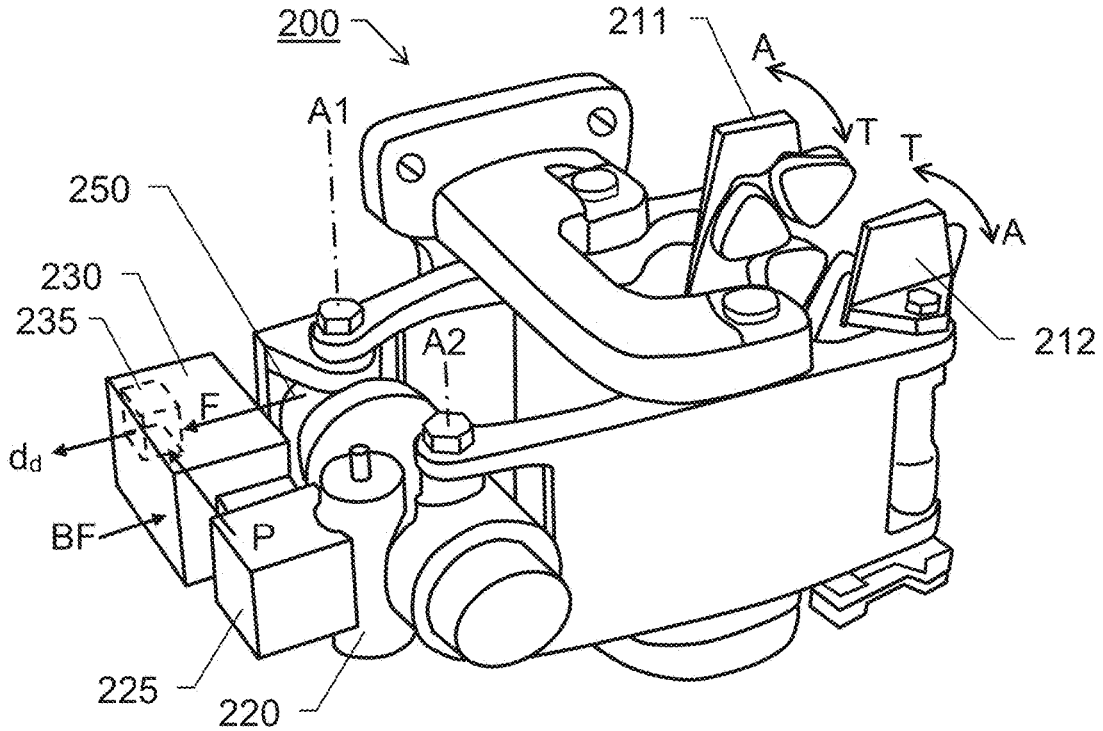
FIG. 2 shows a brake unit according to one embodiment of the invention.

FIG. 2 shows the brake unit 200 according to one embodiment of the invention. The brake unit 200 contains first and second pressing members 211 and 212 respectively, and a rotatable member 110 that is mechanically linked to at least one wheel 105 of the rail vehicle 100. Moreover, the brake unit 200 is configured to receive the electric brake-force signal BF, and in response thereto cause the first and second pressing members 211 and 212 to execute the brake action with respect to the rotatable member 110. Specifically, to execute the brake action, the brake unit 200 further contains a gear assembly 220 and an electric motor 230.

The gear assembly 220 is arranged to operate mechanically on the first and second pressing members 211 and 212. In response to the electric brake-force signal BF, the electric motor 230 is configured to act on the gear assembly 220 so as to cause the first and second pressing members 211 and 212 to move towards T or away A from the rotatable member 110. In other words, in contrast to conventional braking systems, e.g. pneumatically operated, the electric brake-force signal BF may result in active movements of the first and second pressing members 211 and 212 in both directions.

According to the invention, the brake actuator 120 is further configured to produce the electric brake-force signal BF in such a way that the brake action involves moving the first and second pressing members 211 and 212 away A from the rotatable member 110 in response to a deicing criterion DI being fulfilled.

According to one embodiment of the invention, the electric motor 230 is implemented by a stepper motor. This is advantageous because the stepper motor provides highly accurate positioning of its power transmission shaft without requiring a position sensor for feedback. The stepper motor is typically a brushless DC electric motor that divides a full rotation into a number of equal steps, say 100, which may be provided by a gear-shaped iron rotor with 25 teeth giving 3.6 degrees of rotation per step. The stepper motor 230 can be commanded to move and hold a position at one of these steps by open loop control provided that the motor is adapted to the application in respect to torque and speed.

Alternatively, the electric motor 230 may instead be implemented by means of a DC motor. This is beneficial because it is straightforward to control an output torque of the DC motor's power transmission shaft via the magnitude and duration of a control current.

If the deicing criterion DI is fulfilled, according to one embodiment of the invention, the brake actuator 120 is configured to produce the electric brake-force signal BF in such a way the brake action not only involves moving the first and second pressing members 211 and 212 away A from the rotatable member 110, however also towards T the same at least once. Preferably, as will be discussed further below with reference to FIG. 5, the brake action involves moving the first and second pressing members 211 and 212 towards T and away A from the rotatable member 110 in a vibrating movement pattern. Namely, this results in highly efficient crushing and removal of any ice and/or snow 130 that may have formed over the brake unit 200, for example when the rail vehicle 100 has stopped temporarily at a station or when the rail vehicle 100 has travelled across a cold area with varying degrees of air humidity.

Thus, the first and second pressing members 211 and 212 may for example be caused to perform the vibrating movement pattern when releasing the brake. However, the first and second pressing members 211 and 212 may also be caused to perform the vibrating movement pattern in connection with engaging the brake, for example when service braking. In other words, this deicing strategy may be employed irrespective of how the first and second pressing members 211 and 212 are arranged when initiating the vibration. Nevertheless, when starting from an unbraked state it is typically advantageous if the vibrating movement pattern is such that the first and second pressing members 211 and 212 do not make contact with the rotatable member 110 before an actual braking procedure has been initiated.

It is further preferable if the brake actuator 120 has access to temperature data in order to initiate appropriate deicing actions. Therefore, according to one embodiment of the invention, a temperature sensor is configured to generate a temperature signal $S_T$ indicative of an ambient temperature level. The temperature sensor may be represented by a general temperature registering unit that is arranged to provide temperature data to other functions and units in the rail vehicle 100. However, the temperature sensor 640 may equally well be integrated into the brake actuator 120 as exemplified in FIG. 6.

In any case, the brake actuator 120 is configured to receive the temperature signal $S_T$. If the ambient temperature level is less than a threshold temperature, say +4 C°, during at least a predefined period, say 60 minutes, the brake actuator 120 is configured to produce a first trigger signal that causes the deicing criterion DI to be fulfilled. Of course, the first trigger signal may here be represented by an internal process in the brake actuator 120, which means that the fulfillment of the above temperature conditions results in that the deicing condition DI is fulfilled.

Figures 6, 7:
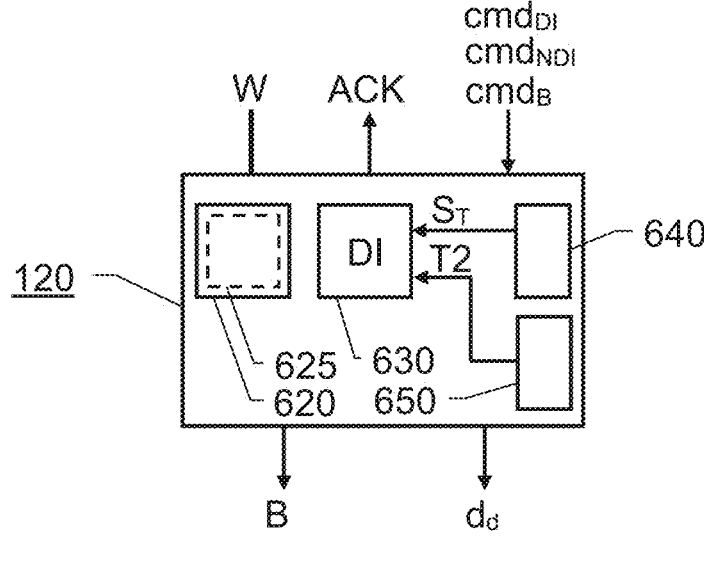
FIG. 6 shows a block diagram of a brake actuator according to one embodiment of the invention.
FIG. 7 illustrates, by means of a flow diagram, the general method according to the invention.

In order to proactively reduce the risk that ice 130 is formed on the braking system, according to one embodiment of the invention, a controller is configured to generate a second trigger signal T2 repeatedly according to a time schedule. As illustrated in FIG. 6, the controller 650 may be integrated into the brake actuator 120. However, according to the invention, the controller may alternatively be arranged in a different unit on the rail vehicle 100. The second trigger signal T2, in turn, causes the deicing criterion DI to be fulfilled. Thus, deicing actions, e.g. moving the first and second pressing members 211 and 212 without causing them to make contact with the rotatable member 110, may be taken at regular intervals to ensure that ice 130 cannot be formed on the critical parts of the braking system.

Figure 3:
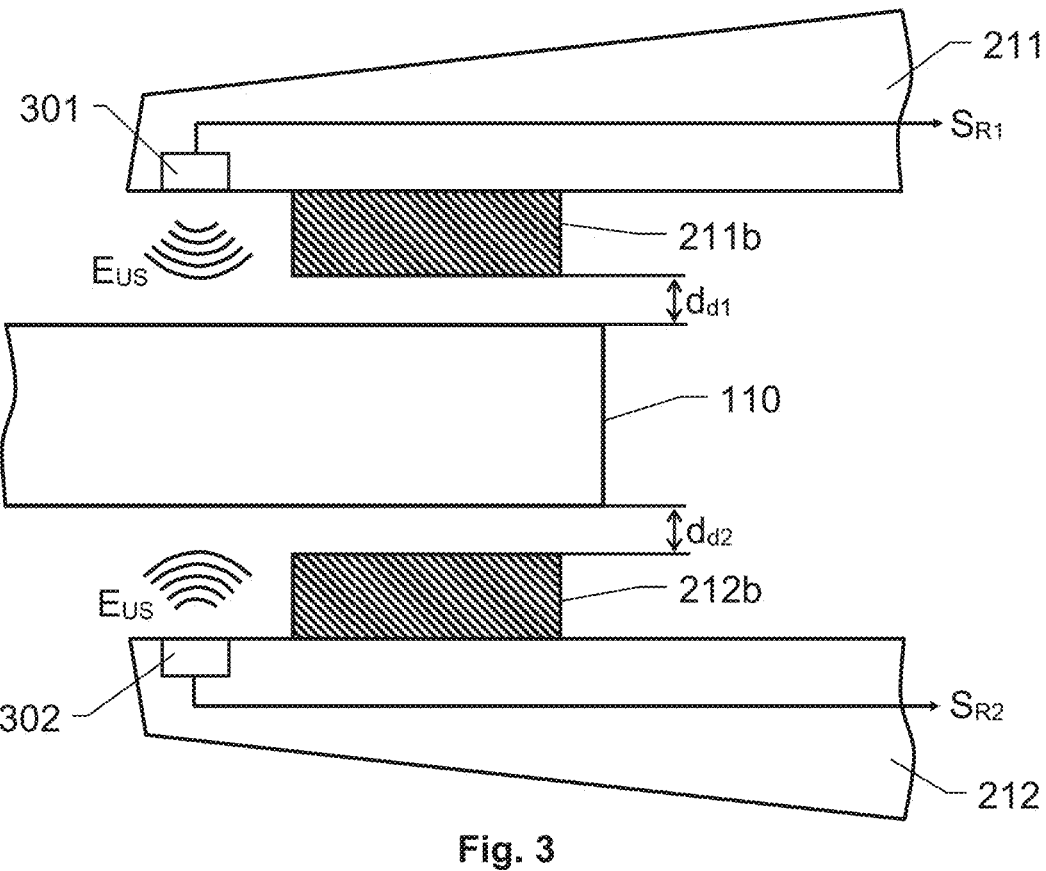
FIG. 3 shows a schematic top view of a pair of pressing members and a rotatable member according to one embodiment of the invention.

FIG. 3 shows a schematic top view of the first and second pressing members 211 and 212 and the rotatable member 110. According to embodiments of the invention, the braking system includes a brake sensor 235 as schematically illustrated in FIG. 2. The brake sensor 235 is configured to determine a respective gap distance $d_{d1}$ and $d_{d2}$ between brake pads of the first and second pressing members 211 and 212 respectively and the rotatable member 110. In FIG. 3, the brake pads are symbolically illustrated by reference numerals 211b and 213b respectively.

The brake actuator 120 is configured to compare the determined respective gap distances $d_{d1}$ and $d_{d2}$ with a set gap distance $d_s$ between the brake pads 211b and 213b of the first and second pressing members 211 and 212 respectively and the rotatable member 110. The set gap distance $d_s$ is a parameter that is assigned in the brake action. Therefore, typically, the set gap distance $d_s$ depends on how hard the braking shall be. For example, in emergency braking when a maximal brake pressure is to be applied, the set gap distance $d_s$ is assigned to a minimum value. During service braking, however, the set gap distance $d_s$ may be assigned to any larger value. If ice 130 has formed on one or more parts of braking system, such as on the first and second pressing members 211 and 212 and/or the rotatable member 110, it may not be possible to attain the set gap distance $d_s$. This means that one or both of the determined gap distances $d_{d1}$ and $d_{d2}$ will differ from the set gap distance $d_s$.

According to this embodiment of the invention, the deicing criterion DI is fulfilled if the magnitude of a difference $|d_s-d_d|$ between the set gap distance $d_s$ and the respective determined gap distances $d_{d1}$ and $d_{d2}$ exceeds a tolerance interval $d_{th}$. Ideally, the determined gap distances $d_{d1}$ and $d_{d2}$ shall both be equal to each other and equal to the set gap distance $d_s$. Therefore, it is typically sufficient if one the magnitudes $|d_s-d_{d1}|$ and $|d_s-d_{d2}|$ exceeds the tolerance interval $d_{th}$ in order for the deicing criterion DI to be fulfilled.

Figure 4:
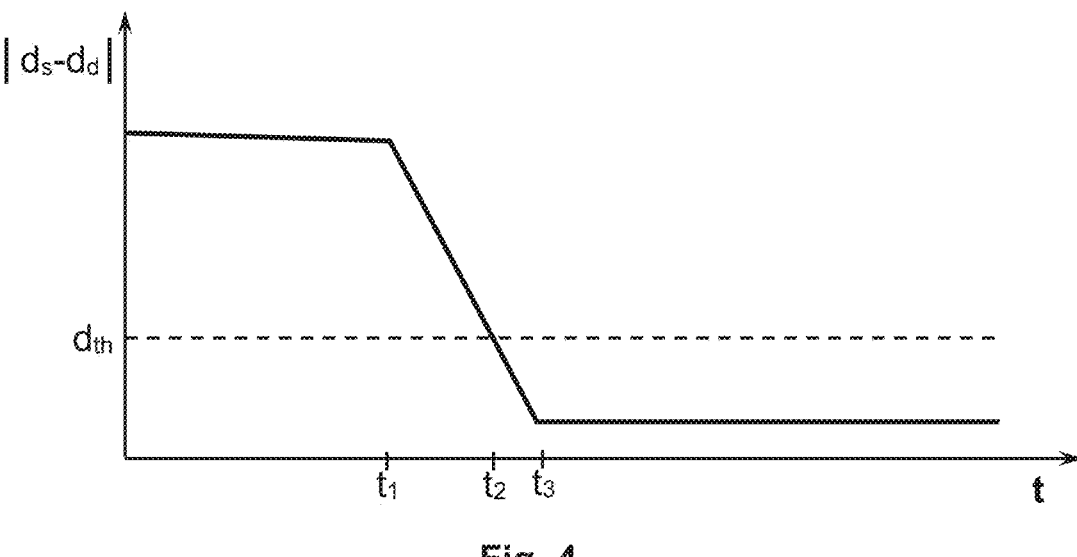
FIG. 4 shows a diagram exemplifying how a difference between a set gap distance and a determined gap distance may vary as a function of time according to one embodiment of the invention.

FIG. 4 shows a diagram exemplifying how the magnitude of the difference $|d_s-d_d|$ between the set gap distance $d_s$ and the determined gap distance $d_4$ may vary as a function of time t according to one embodiment of the invention. Here, at a first point in time $t_1$, it is found that the deicing criterion DI is fulfilled. Consequently, a brake action is effected, which at least involves moving the first and second pressing members 211 and 212 away A from the rotatable member 110. As a result, the magnitude of the difference $|d_s-d_d|$ decreases gradually as said brake action progresses, and at a second point in time $t_2$, the difference value falls below the tolerance interval $d_{th}$. At yet a later point in time $t_3$, the brake action stops and the difference value levels out.

According to embodiments of the invention, the actual gap distance da may be determined in different ways. Referring again to FIG. 2, the gear assembly 220 may for example contain a pulse encoder 225 that is configured to generate a pulse signal P #reflecting a position interrelationship between the first and second pressing members 211 and 212. Due to the mechanical rigidity of the gear assembly 220, it is possible to arrange the pulse encoder 225 at a multitude of positions where two movable parts of the gear assembly 220 join. In FIG. 2, the pulse encoder 225 is symbolically indicated to be located in a housing of the gear assembly 220. Based on the pulse signal P #, the brake sensor 235 is configured to determine the gap distance da, for example by employing a known mechanical relationship between said movable parts.

According to another embodiment of the invention, the gear assembly 220 includes a load-cell sensor 250 configured to produce a force signal F reflecting the magnitude of a force applied by the first and second pressing members 211 and 212 respectively on the rotatable member 110. Namely, there is a direct and unambiguous relationship between this force and the gap distance da. Thus, the brake sensor 235 is configured to determine the gap distance da based on the force signal F. In FIG. 2, the load-cell sensor is symbolically indicated by reference numeral 250. A transducer of the load-cell sensor 250 is preferably arranged along at least one of a respective axis A1 and A2 around which each of the first and second pressing members 211 and 212 is pivotable.

According to yet another embodiment of the invention, the brake sensor 235 is configured to determine the gap distance $d_d$ based on the magnitude of a current fed to the electric motor 230 and a period during which the current has been fed to the electric motor 230. This is especially advantageous if the electric motor 230 is of DC-motor type because for such motors there is a straightforward relationship between the magnitude of the supplied current, the extension of time during which the current has been supplied and the torque of the motor's power transmission shaft. The torque, in turn, is directly correlated with the determine the gap distance $d_d$.

Referring now to FIG. 3 again, according to still another embodiment of the invention, the first and second pressing members 211 and 212 respectively contain at least one ultrasonic sensor, for example 301 and 302, each of which is configured to emit ultrasound energy $E_{US}$ towards the rotatable member 110. The ultrasonic sensors are further configured to produce a respective ranging signal $S_{R1}$ and $S_{R2}$ based on reflections of the emitted ultrasound energy $E_{US}$ against the rotatable member 110. The brake sensor 235 is configured to determine the gap distance $d_d$, for example represented by one or both of distances $d_{d1}$ and $d_{d2}$, based on the at least one ranging signal $S_{R1}$ and/or $S_{R2}$.

Figure 5:
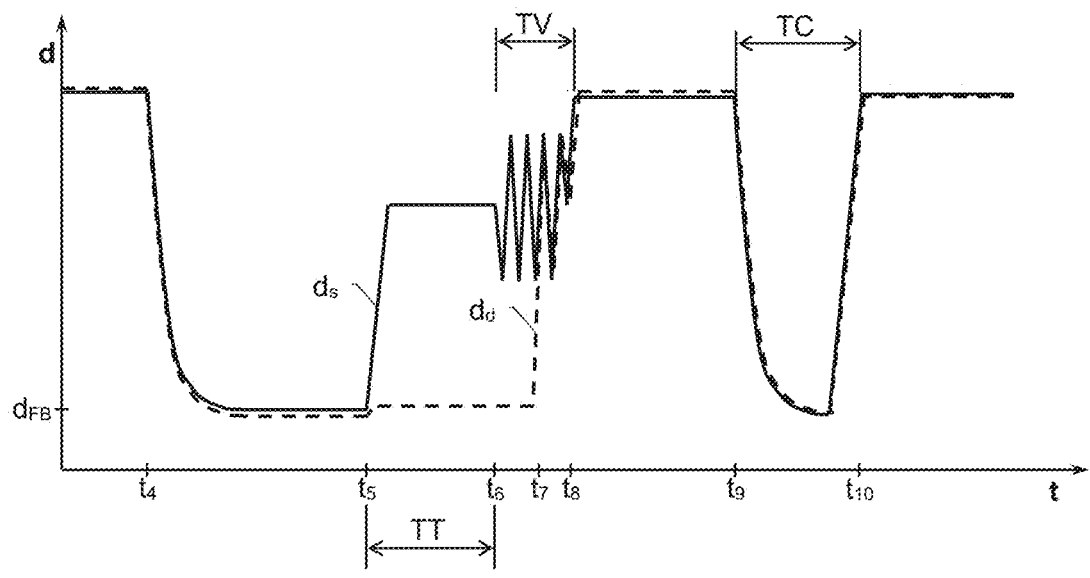
FIG. 5 shows a diagram exemplifying how the set and determined gap distances may vary over time according to one embodiment of the invention.

In FIG. 5, we see a diagram exemplifying how the set gap distance $d_s$ and the determined gap distance $d_d$ may vary over time t according to one embodiment of the invention.

At a point in time $t_4$, the brake actuator 120 receives a brake com-mand $cmd_B$ that represents full braking force, which is equivalent to a set gap distance $d_s$ equal to $d_{FB}$. Until a later point in time $t_5$, the train vehicle 100 stays at a station. Due to the weather conditions, ice is formed on the braking system while the rail vehicle is stationary; and as a result, the first and second pressing members 211 and 212 become stuck against the rotatable member 110. Consequently, when at $t_5$ the brake actuator 120 receives a brake com-mand $cmd_B$ that represents releasing of the brake and the set gap distance $d_s$ increases rapidly. However, the determined gap distance $d_d$ remains at the $d_{FB}$ level. After expiry of a test period TT, at a point in time $t_6$, the brake actuator 120 establishes that the magnitude of the difference $|d_s{-}d_d|$ between the set gap distance $d_s$ and the determined gap distance $d_d$ exceeds the tolerance interval $d_{th}$.

Therefore, the deicing criterion DI is fulfilled, and the brake actuator 120 produces the electric brake-force signal BF in such a way that the brake action involves moving the first and second pressing members 211 and 212 away A and towards T the rotatable member 110 in a vibrating movement pattern during a vibration period TV extending until a point in time $t_8$. At a point in time $t_7$ prior to $t_8$, the ice is crushed by the vibrating movements, and the determined gap distance $d_d$ starts to follow set gap distance $d_s$. When the vibration period TV has ended, the brake actuator 120 produces the electric brake-force signal BF such that the brake is fully released.

Preferably, after completing an ice-braking process as described above, a calibration procedure TC follows. In FIG. 5, this is illustrated by a full test braking at a point in time $t_9$ and a subsequent full brake release, which is completed at a point in time $t_{10}$. In the illustrated example, the set and determined gap distances $d_s$ and $d_d$ match during the calibration procedure TC, which indicates that these measures are calibrated.

According to one embodiment of the invention, after producing the electric brake-force signal BF in such a way that the brake action at least involves moving the first and second pressing members 211 and 212 away A from the rotatable member 110, the brake actuator 120 is configured to establish the magnitude of the difference $|d_s{-}d_d|$ between the set and determined gap distances $d_s$ and $d_d$ respectively. If the magnitude $|d_s{-}d_d|$ is less than or equal to the tolerance interval $d_{th}$, the brake actuator 120 is configured to regard the deicing criterion DI as not to be fulfilled anymore. Thus, for instance any ongoing vibration of the first and second pressing members 211 and 212 can be aborted.

Additionally, it is advantageous if the deicing criterion DI may be reset manually. Therefore, according to one embodiment of the invention, the brake actuator 120 is configured to receive a user-generated deactivation instruction $cmd_{DNI}$, for example from a driver of the rail vehicle or a service technician. In response to the user-generated deactivation instruction $cmd_{DNI}$, the brake actuator 120 is configured to regard the deicing criterion DI as not to be fulfilled.

Naturally, irrespective of whether the deicing criterion DI was reset automatically or manually, it is relevant to indicate the updated status to an operator, e.g. the driver and/or a service technician. To this aim, according to one embodiment of the invention, the brake actuator 120 is configured to generate an acknowledgement message ACK in response to regarding the deicing criterion DI as not to be fulfilled.

Preferably, as exemplified in FIG. 1, the brake actuator 220 is connected to a first data bus 250 in the rail vehicle 200, which first data bus 250 is configured to communicate status messages SS. In such a case, it is advantageous if the brake actuator 220 is configured to forward the acknowl-edgment message ACK as a status message SS over the first data bus 250, for example to the driver's cabin.

The rail vehicle 100 may also contain a second data bus 260, which is connected to the brake actuator 220 and which second data bus 260 is configured to communicate control signals CS, such as the brake command $cmd_B$ to the brake actuator 220. Here, the brake actuator 120 may further be configured to receive a user-generated activation instruction $cmd_{DI}$ in the form of a control signal CS over the second data bus 260.

In response to receiving the user-generated activation instruction $cmd_{DI}$ the brake actuator 120 is configured to regard the deicing criterion DI as fulfilled. Thus, an operator may manually initiate a deicing process if for example he/she foresees that this is appropriate.

Of course, the second data bus 260 may also be used to forward the user-generated deactivation instruction $cmd_{DNI}$ to the brake actuator 12.

It is generally advantageous if the above-described braking procedure is effected in an automatic manner by executing one or more computer programs. Therefore, the brake actuator 120 preferably includes processing circuitry and programmed memory units, the design of which will be briefly described below with reference to FIG. 6.

FIG. 6 shows a block diagram of the brake actuator 120 according to one embodiment of the invention. The brake actuator 120 includes processing circuitry in the form of at least one processor 630 and a memory unit 620, i.e. non-volatile data carrier, storing a computer program 625, which, in turn, contains software for making the at least one processor 630 execute the actions mentioned in this disclosure when the computer program 625 is run on the at least one processor 630. FIG. 6 also illustrates the temperature sensor 640 and the controller 650.

The temperature sensor 640 is configured to generate the temperature signal $S_T$ indicating the ambient temperature level to the at least one processor 630. The controller 650 is configured to generate a second trigger signal T2 repeatedly according to a time schedule, which second trigger signal T2 causes the deicing criterion DI to be fulfilled.

In addition to that, FIG. 6 shows a power input W, a respective connection to the first and second data buses 250 and 260 via which the acknowledgement message ACK is sent and the commands $cmd_B$, $cmd_{NDI}$ and $cmd_{DI}$ are received respectively.

In order to sum up, and with reference to the flow diagram in FIG. 7, we will now describe the computer-implemented method according to the invention of controlling a braking system of a rail vehicle, which system is presumed to contain a brake unit 200 having first and second pressing members 211 and 212 respectively, and a rotatable member 110 being mechanically linked to at least one wheel 105 of the rail vehicle 100. Moreover, the brake unit is configured to receive the electric brake-force signal BF, and in response thereto cause the first and second pressing members 211 and 212 to execute the brake action with respect to the rotatable member 110.

In a first step 710, it is checked whether a deicing criterion is fulfilled; and if so, a step 720 follows. Otherwise, the procedure loops back and stays in step 710.

In step 720, an electric brake-force signal is produced, which via an electric motor 230 and a gear assembly 220 in the brake unit 200 is configured to cause the first and second pressing members 211 and 212 to move away A from the rotatable member 110, so that any ice/snow on the braking system, especially surrounding the first and second pressing members 211 and 212, is expected to break and fall off.

Thereafter, a step 730 follows in which it is checked whether the deicing criterion still is fulfilled. If so, the procedure loops back to step 720 for a continued deicing process; and otherwise, the procedure loops back to step 710.

All of the process steps, as well as any sub-sequence of steps, described with reference to FIG. 7 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

Variations to the disclosed embodiments can be understood and effected by those skilled in the art in practicing the claimed invention, from a study of the drawings, the disclosure, and the appended claims.

The invention is not restricted to the described embodiments in the figures, but may be varied freely within the scope of the claims.

The invention claimed is:

1. A braking system for a rail vehicle (100), which braking system comprises:

a brake actuator (120) configured to receive a brake command ($cmd_B$), and in response thereto produce an electric brake-force signal (BF) commanding a brake action, and a brake unit (200) comprising first and second pressing members (211, 212) and a rotatable member (110) being mechanically linked to at least one wheel (105) of the rail vehicle (100), which brake unit (200) is configured to receive the electric brake-force signal (BF), and in response thereto cause the first and second pressing members (211, 212) to execute the brake action with respect to the rotatable member (110), wherein the brake unit (200) further comprises a gear assembly (220) arranged to operate mechanically on the first and second pressing members (211; 212), and an electric motor (230) configured to, in response to the electric brake-force signal (BF), act on the gear assembly (220) to cause the first and second pressing members (211; 212) to move towards (T) or away (A) from the rotatable member (110) and the brake actuator (120) is further configured to produce the electric brake-force signal (BF) in such a way that the brake action involves moving the first and second pressing members (211; 212) away (A) from the rotatable member (110) in response to a deicing criterion (DI) being fulfilled.

2. The braking system according to claim 1, wherein, if the deicing criterion (DI) is fulfilled, the brake actuator (120) is configured to produce the electric brake-force signal (BF) in such a way that the brake action involves moving the first and second pressing members (211; 212) towards (T) and away (A) from the rotatable member (110) in a vibrating movement pattern.

3. The braking system according to claim 1, comprising a temperature sensor (640) configured to generate a temperature signal ($S_T$) indicative of an ambient temperature level, and the brake actuator (120) is configured to receive the temperature signal ($S_T$), and if the ambient temperature level is less than a threshold temperature during at least a predefined period, and produce a first trigger signal that causes the deicing criterion (DI) to be fulfilled.

4. The braking system according to claim 3, wherein the temperature sensor (640) is integrated into the brake actuator (120).

5. The braking system according to claim 1, comprising a controller (650) configured to generate a second trigger signal (T2) repeatedly according to a time schedule, which second trigger signal (T2) causes the deicing criterion (DI) to be fulfilled.

6. The braking system according to claim 5, wherein the controller (650) is integrated into the brake actuator (120).

7. The braking system according to claim 1, comprising a brake sensor (235) configured to determine a respective gap distance ($d_{d1}$; $d_{d2}$) between brake pads (211b; 213b) of the first and second pressing members (211; 212) and the rotatable member (110), and wherein the brake actuator (120) is further configured to compare the determined respective gap distances ($d_{d1}$; $d_{d2}$) with a set gap distance ($d_s$) between the brake pads (211b; 213b) of the first and second pressing members (211; 212) and the rotatable member (110), which set gap distance ($d_s$) is a parameter assigned in the brake action, and the deicing criterion (DI) is fulfilled if the magnitude of a difference ($|d_s-d_d|$) between the set gap distance and the respective determined gap distances exceeds a tolerance interval ($d_{th}$).

8. The braking system according to claim 7, wherein the gear assembly (220) comprises a pulse encoder (225) configured to generate a pulse signal (P #) reflecting a position interrelationship between the first and second pressing members (211; 212), and the brake sensor (235) is configured to determine the gap distance (dd) based on the pulse signal (P #).

9. The braking system according to claim 7, wherein the gear assembly (220) comprises a load-cell sensor (250) configured to produce a force signal (F) reflecting the magnitude of a force applied by the first and second pressing members (211; 212) on the rotatable member (110), and the brake sensor (235) is configured to determine the gap distance ($d_d$) based on the force signal (F).

10. The braking system according to claim 7, wherein the brake sensor (235) is configured to determine the gap distance ($d_d$) based on the magnitude of a current fed to the electric motor (230) and a period during which the current has been fed to the electric motor (230).

11. The braking system according to claim 7, wherein the first and second pressing members (211; 212) comprises at least one ultrasonic sensor (301; 302) configured to emit ultrasound energy ($E_{US}$) and produce at least one ranging signal (SR1; SR2) based on reflections of the emitted ultrasound energy ($E_{US}$) against the rotatable member (110), and the brake sensor (235) is configured to determine the gap distance (dd) based on the at least one ranging signal ($S_{R1}$; $S_{R2}$).

12. The braking system according to claim 7, wherein after producing the electric brake-force signal (BF) in such a way that the brake action involves moving the first and second pressing members (211; 212) away (A) from the rotatable member (110), the brake actuator (120) is configured to establish the magnitude of the difference ($|d_s-d_d|$) between the set and determined gap distances ($d_s$; da), and if said magnitude is less than or equal to the tolerance interval ($d_{th}$), and regard the deicing criterion (DI) not to be fulfilled.

13. The braking system according to claim 7, wherein the brake actuator (120) is configured to receive a user-generated deactivation instruction ($\text{cmd}_{DNI}$); and in response thereto, and regard the deicing criterion (DI) not to be fulfilled.

14. The braking system according to claim 12, wherein the brake actuator (120) is configured to generate an acknowledgement message (ACK) in response to the regarding the deicing criterion (DI) not to be fulfilled.

15. The braking system according to claim 14, wherein the brake actuator (220) is connected to a first data bus (250)

in the rail vehicle (200), which first data bus (250) is configured to communicate status messages (SS).

16. The braking system according to claim 15, wherein the brake actuator (220) is configured to forward the acknowledgment message (ACK) as a status message (SS) over the first data bus (250).

17. The braking system according to claim 1, wherein the brake actuator (220) is connected to a second data bus (260) in the rail vehicle (200), which second data bus (260) is configured to communicate control signals (CS).

18. The braking system according to claim 17, wherein the brake actuator (220) is configured to receive the brake command ($\text{cmd}_B$) as a control signal (CS) over the second data bus (260).

19. The braking system according to claim 1, wherein the brake actuator (120) is configured to receive a user-generated activation instruction ($\text{cmd}_{DI}$), and in response thereto, regard the deicing criterion (DI) as fulfilled.

20. A computer-implemented method of controlling a braking system for a rail vehicle (100), which braking system comprises a brake actuator (120), which method is executed by at least one processor (630) in the brake actuator (120) and comprises receiving a brake command ($\text{cmd}_B$), and in response thereto, and producing an electric brake-force signal (BF) commanding a brake action, the braking system further comprising a brake unit (200) having first and second pressing members (211, 212), and a rotatable member (110) being mechanically linked to at least one wheel (105) of the rail vehicle (100), the brake unit being configured to receive the electric brake-force signal (BF), and in response thereto cause the first and second pressing members (211, 212) to execute the brake action with respect to the rotatable member (110), the brake unit (200) further comprising a gear assembly (220) arranged to operate mechanically on the first and second pressing members (211; 212), the braking system comprising an electric motor (230) configured to, in response to the electric brake-force signal (BF), act on the gear assembly (220) to cause the first and second pressing members (211; 212) to move towards (T) or away (A) from the rotatable member (110), and the method comprising checking if a deicing criterion (DI) is fulfilled, and if the deicing criterion (DI) is fulfilled, producing the electric brake-force signal (BF) in such a way that the brake action involves moving the first and second pressing members (211; 212) away (A) from the rotatable member (110).

* * * * *